US008081921B2

(12) United States Patent
Batcheller et al.

(10) Patent No.: US 8,081,921 B2
(45) Date of Patent: *Dec. 20, 2011

(54) FLIGHT TRAINING AND SYNTHETIC VISUALIZATION SYSTEM AND METHOD

(75) Inventors: Barry Douglas Batcheller, West Fargo, ND (US); Tyler Chris Ohlsen, Fargo, ND (US)

(73) Assignee: Appareo Systems, LLC, Fargo, ND (US)

(*) Notice: Subject to any disclaimer, the term of this patent is extended or adjusted under 35 U.S.C. 154(b) by 0 days.

This patent is subject to a terminal disclaimer.

(21) Appl. No.: 12/961,612

(22) Filed: Dec. 7, 2010

(65) Prior Publication Data

US 2011/0171611 A1    Jul. 14, 2011

Related U.S. Application Data

(63) Continuation of application No. 11/327,965, filed on Jan. 9, 2006, now Pat. No. 7,848,698.

(60) Provisional application No. 60/701,736, filed on Jul. 22, 2005.

(51) Int. Cl.
*G09B 9/00* (2006.01)

(52) U.S. Cl. .............. 434/2; 434/29; 434/30; 434/35; 434/36

(58) Field of Classification Search ............ 434/30, 434/32, 33, 35, 47
See application file for complete search history.

(56) References Cited

U.S. PATENT DOCUMENTS

| | | | |
|---|---|---|---|
| 2,975,671 A * | 3/1961 | Hemstreet | 353/5 |
| 3,081,557 A * | 3/1963 | Mailhot | 434/42 |
| 3,784,969 A * | 1/1974 | Wilckens et al. | 340/972 |
| 4,226,491 A | 10/1980 | Kazama | |
| 4,263,726 A * | 4/1981 | Bolton | 434/43 |
| 4,276,029 A * | 6/1981 | Gilson et al. | 434/43 |
| 4,470,116 A | 9/1984 | Ratchford | |
| 4,527,980 A | 7/1985 | Miller | |
| 4,644,494 A | 2/1987 | Muller | |
| 4,694,119 A | 9/1987 | Groenewegen | |
| 4,740,779 A * | 4/1988 | Cleary et al. | 345/7 |
| 4,944,401 A | 7/1990 | Groenewegen | |
| 5,123,538 A | 6/1992 | Groenewegen | |
| 5,173,856 A | 12/1992 | Purnell et al. | |
| 5,272,652 A | 12/1993 | Rosenshein et al. | |
| 5,438,162 A | 8/1995 | Thompson et al. | |
| 5,750,925 A | 5/1998 | Purdom | |

(Continued)

FOREIGN PATENT DOCUMENTS

CA     2305633     10/2001

(Continued)

*Primary Examiner* — Xuan Thai
*Assistant Examiner* — Robert J Utama
(74) *Attorney, Agent, or Firm* — Mark E. Brown; Jonathan Tolstedt

(57) ABSTRACT

A low-cost training and synthetic visualization system and method directed to improving an individual's airborne performance in general aviation, skydiving, and other aerial applications. The system is comprised of a self-contained mobile sensor and data storage device for recording the travel path, orientation, and forces acting upon an object as it moves through space, a desktop graphics software program for creating a playback of the recorded data on a three-dimensional representation of the environment through which the object moved, a means of linking the sensor and data storage device to the software program for the purpose of exchanging information, and a centralized data storage and retrieval system designed to accept, assimilate and redistribute the recorded data.

16 Claims, 13 Drawing Sheets

U.S. PATENT DOCUMENTS

| | | | |
|---|---|---|---|
| 5,756,934 A | 5/1998 | Purdom | |
| 6,052,792 A * | 4/2000 | Mensch, Jr. | 713/322 |
| 6,126,449 A * | 10/2000 | Burns | 434/252 |
| 6,148,179 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 | 1/2001 | Wright et al. | |
| 6,219,618 B1 * | 4/2001 | Bateman | 701/301 |
| 6,345,232 B1 * | 2/2002 | Lynch et al. | 701/214 |
| 6,353,734 B1 | 3/2002 | Wright et al. | |
| 6,389,333 B1 * | 5/2002 | Hansman et al. | 701/3 |
| 6,397,128 B1 | 5/2002 | Todd | |
| 6,415,227 B1 | 7/2002 | Lin | |
| 6,473,676 B2 * | 10/2002 | Katz et al. | 701/4 |
| 6,480,152 B2 * | 11/2002 | Lin et al. | 342/357.32 |
| D470,450 S | 2/2003 | Olzak | |
| 6,634,885 B2 * | 10/2003 | Hodgetts et al. | 434/55 |
| 6,671,648 B2 * | 12/2003 | McCall et al. | 702/141 |
| 6,678,588 B2 * | 1/2004 | He | 701/3 |
| 6,721,640 B2 | 4/2004 | Glenn et al. | |
| 6,762,942 B1 | 7/2004 | Smith | |
| 6,792,353 B2 * | 9/2004 | Lin | 701/213 |
| 6,822,161 B2 | 11/2004 | Komatsu et al. | |
| 6,822,624 B2 * | 11/2004 | Naimer et al. | 345/9 |
| 6,867,367 B2 | 3/2005 | Zimmerman | |
| 6,879,875 B1 * | 4/2005 | Hu et al. | 700/213 |
| 6,885,971 B2 * | 4/2005 | Vock et al. | 702/182 |
| 6,898,492 B2 * | 5/2005 | de Leon et al. | 701/35 |
| 6,915,206 B2 * | 7/2005 | Sasajima | 701/208 |
| 7,020,708 B2 | 3/2006 | Nelson et al. | |
| 7,023,695 B2 | 4/2006 | McCollum et al. | |
| 7,177,939 B2 | 2/2007 | Nelson et al. | |
| 7,203,630 B2 | 4/2007 | Kolb et al. | |
| 7,333,343 B2 | 2/2008 | Olzak | |
| 7,356,389 B2 | 4/2008 | Holst et al. | |
| 7,375,678 B2 * | 5/2008 | Feyereisen et al. | 342/180 |
| 7,742,080 B2 | 6/2010 | Nakajima | |
| 2002/0026567 A1 | 2/2002 | Naito et al. | |
| 2002/0035416 A1 * | 3/2002 | De Leon | 701/14 |
| 2003/0195672 A1 * | 10/2003 | He | 701/3 |
| 2003/0225492 A1 * | 12/2003 | Cope et al. | 701/35 |
| 2005/0220055 A1 | 10/2005 | Nelson et al. | |
| 2005/0246353 A1 | 11/2005 | Ezer et al. | |
| 2006/0057974 A1 | 3/2006 | Ziarno et al. | |
| 2006/0176651 A1 | 8/2006 | Olzak | |
| 2007/0020588 A1 * | 1/2007 | Batcheller et al. | 434/30 |
| 2007/0100516 A1 | 5/2007 | Olzak | |
| 2010/0092926 A1 * | 4/2010 | Fabling | 434/30 |

FOREIGN PATENT DOCUMENTS

| | | |
|---|---|---|
| EP | 0445270 | 10/1992 |
| EP | 1053290 | 3/2003 |
| WO | WO-8503583 | 8/1985 |
| WO | WO-9104525 | 4/1991 |
| WO | WO-9104921 | 4/1991 |
| WO | WO-0160693 | 8/2001 |
| WO | WO-2004045106 | 5/2004 |
| WO | WO-2005031272 | 4/2005 |
| WO | WO-2005053524 | 6/2005 |
| WO | WO-2005053528 | 6/2005 |
| WO | WO-2007046831 | 4/2007 |

* cited by examiner

FLIGHT TRAINING AND SYNTHETIC VISUALIZATION SYSTEM AND METHOD

CROSS-REFERENCE TO RELATED PATENT APPLICATIONS

This application is a continuation of and claims the benefit of U.S. patent application No. 11/327,965, entitled "Flight Training and Synthetic Visualization System and Method," filed Jan. 9, 2006, now U.S. Pat. No. 7,848,698, issued Dec. 7, 2010, and U.S. Provisional Patent Application No. 60/701,736, entitled, "Low-Cost Flight Training and Synthetic Visualization System," filed Jul. 22, 2005.

FIELD OF INVENTION

This invention pertains to a low-cost system and method for providing flight training through the use of a self-contained mobile data acquisition, recording and storage unit that takes quantitative measurements of an airborne object's movement and orientation in a three-dimensional space, and the subsequent processing and playback of said measurements.

BACKGROUND

Various methodologies have been developed that provide flight training and/or analysis of pre-recorded activities. One methodology provides a realistic, three-dimensional software simulation of flight in order to allow pilots to practice flight techniques without actually flying in an airplane. An example of this methodology is the software program called "Flight Simulator" by Microsoft Corporation. In this and other similar flight simulation programs, a user can complete a simulated flight and then play the simulation back to analyze their performance. Programs of this nature provide realistic simulations of flight in an artificially generated three-dimensional environment in which aircraft behaviors are modeled quite accurately with respect to the physics of flight. However real the simulation may appear, the information produced is still only a simulation and can not provoke the behaviors and responses of a student in a real airplane in a real life training situation whose behavior has life and death consequences. Neither can a simulation provide the sensory perception imparted to a person in flight by an actual airplane that is acted upon by external stimulations such as weather, loading, and altitude.

Inventors have developed full-motion or partial-motion flight simulator systems that attempt to improve on software-only flight simulators. U.S. Pat. No. 6,634,885 B2, issued to Hodgetts et al., describes a system that mounts a simulated aircraft flight deck onto a motion platform that is moved by electric motors to recreate the motions one would feel in an actual aircraft. This system can be coupled with and controlled by a flight simulator program such as Microsoft Flight Simulator.

U.S. Pat. No. 4,527,980, issued to Miller, describes a flight simulating video game system that uses an aircraft-shaped enclosure resting on a parabolic dish to produce pitch and roll movements based on the operator's movements of the flight controls. A monitor inside the enclosure displays simulated flight images that are oriented based on the current position of the aircraft-shaped enclosure to simulate the view through an aircraft window.

The addition of movement and tactile feedback is a distinct improvement over a software-only system for flight training, but demands a complex, bulky, and expensive electro-mechanical platform to add even the simplest motion, making it impractical for private home use.

Another category of inventions includes inertial measurement units (IMUs) which are permanently mounted in an aircraft and which take measurements on the aircraft's movements through space. The most effective of these devices are those which combine sensors (such as accelerometers and gyroscopes) that measure inertial movement with global positioning system (GPS) sensors to measure latitude, longitude, and altitude. Although these devices are not designed to be flight training systems, the data they produce can be useful in flight training situations.

U.S. Pat. No. 6,480,152 B2, issued to Lin et al., and its related applications describe a micro-system which integrates a separate IMU with a GPS chipset and magnetic field sensor to produce highly-accurate data relating to flight which can be off loaded to an external system. This device will generate information about the aircraft including position (in terms of latitude, longitude, and altitude), orientation (in terms of yaw, pitch, and roll), and magnetic heading. One of the drawbacks of this invention is that it does not have its own rechargeable power source, and must be direct-wired into a vehicle's power supply. It is not a self-contained, mobile device with an integral set of user controls and feedback devices. This prevents the device from being quickly moved from vehicle to vehicle or from vehicle to home, and does not allow for use on a human body. The invention claimed does not store the data it records for later transmission to and processing by a separate analysis system, but sends it immediately to a user interface. The claimed invention does not include a separate component for the processing and display of the information that is captured by the device. Although the invention has usefulness as an aircraft instrument and data source, its usefulness as a flight training system is limited.

Atair Aerospace of Brooklyn, NY, provides a portable data acquisition unit which combines GPS and an IMU to record navigation information. This stored information can be later downloaded using a direct wired connection to another system. A separate desktop software application allows the user to display the recorded data and view simple two-dimensional and three-dimensional graphs of the data. This system does not provide integrated user controls, but is instead activated by a remote switch. This system does not have an integrated power source and charging circuit, and requires an external battery pack or power source. The data acquisition unit cannot be quickly moved from one application to the next, and is not designed to be used on a human body.

Eagle Tree Systems, LLC, of Bellevue, WA, offers a data recording system for radio controlled (RC) aircraft that can track and transmit several performance parameters for the aircraft, including speed, engine RPM, and the positions of the servo motors controlling the various flight surfaces. This data can be transmitted to the operator of the RC aircraft, who can use the data to monitor the flight. Additional data can be added by plugging in a separate GPS module which can provide position data for the aircraft. This GPS position data can be used to provide a crude playback of the completed flight. The GPS module is not an integral part of the main flight recorder and must be purchased separately. The system does not provide information on the orientation of the aircraft (that is, the current yaw, pitch, and roll of the vehicle), and does not have an inertial measurement unit or alternate means of position detection when the GPS signal is lost. The main function of the system is to track engine and aircraft performance including the position of the servo motors. The Eagle Tree system is intended for use on unmanned vehicles only and is not a manned flight training system.

A third category of inventions includes systems which are designed to measure the movement of a body through three-dimensional space and to create a playback of that movement on a separate external system. The referenced patents are not flight training systems, but describe systems that can be used to facilitate training in other applications through the measurement of a moving object.

U.S. Pat. No. 6,885,971 B2, issued to Vock et al., describes several methods and systems for measuring the various performance parameters associated with extreme sports. Data on parameters is collected by a set of sensors that can include a microphone system for detecting vibration and shifts in unit speed, an accelerometer for detecting changes in movement, and pressure sensors for detecting changes in altitude. The data is collected by a sensor or group of sensors located on the body during an event, and transmitted to a base station where the Internet is used to view the data. This invention is designed to measure performance parameters such as "air time" (the length of time a body remains off the ground), "drop distance" (the vertical distance covered by an athlete going over a jump or drop-off), and "power" (the total number of g-forces experienced by the athlete during a performance). These measurements are gathered by sensors which require interaction with the ground (measuring vibration, sound, and sudden acceleration changes) and are not suited for use on an aircraft. The invention does not have a method for determining position (latitude and longitude), and has no method for measuring the orientation (yaw, pitch, and roll) of a moving body.

WIPO Pat. No. WO 2005/053524 A1, issued to Limma et al., describes a method and system for measuring information from an activity and displaying feedback on that activity to at least one individual. This system relies on the signal from a GPS receiver to determine an individual's position (latitude and longitude) and altitude. In addition to the GPS position, the sensor for this system may include a barometer and thermometer for measuring ambient pressure and temperature, and a heart rate monitor for measuring the heart rate of the individual during the activity. This system is not designed to be mounted in an aircraft or other airborne vehicle. There is no means of inertial measurement, and therefore no direct means to determine the orientation (yaw, pitch, and roll) of the moving body.

WIPO Pat. No. WO 2005/053528 A1, also issued to Limma et al., is based on an invention similar to that described in WO 2005/053524 A1, but further provides a method for comparing the performance in a previous event to the ongoing performance in the current event. The system displays feedback in the form of an ongoing comparison of the two events, and allows a performer to see if they are matching or exceeding the previous performance. As with the previous patent described (WO 2005/053524 A1), this invention is not designed to be used in an aircraft or other airborne vehicle, and provides no means of inertial measurement.

U.S. Pat. No. 5,173,856, issued to Purnell et al., describes a vehicle data recording system used for recording measurements from on-vehicle sensors. The primary application of this system is in automobiles and automobile racing. This system is capable of logging measurements in memory and later displaying these measurements against a second set of measurements so that the two sets can be compared to highlight differences. This system is not fully self-contained, and relies on obtaining data from existing on-vehicle sensors, as well as sensors permanently mounted on the vehicle course or racetrack. The system does not provide the three-dimensional position or orientation of the vehicle, but merely records data from the aforementioned sensors. The system is designed to be permanently mounted in a vehicle, and tied to that vehicle's systems, and cannot be quickly moved to another vehicle or attached to a human body.

Many of the inventions described herein rely on the permanent mounting and integration of the electronic sensors into a vehicle system, which prevents the sensors from being quickly ported to other varied applications. Other inventions are mobile and can be used to record data, but are based on limited sensing capabilities that do not fully capture the movements or position of a moving body. The known solutions referenced herein do not describe a flight training and synthetic visualization system or method which comprises a fully mobile and self-contained data recording unit, a software means for creating a playback of the recorded trip, a means of linking the mobile data recording unit to the software means for the purpose of exchanging information, and a centralized database designed to accept recorded trip data.

SUMMARY OF THE INVENTION

Accordingly, it is a main objective of the present invention to describe a flight training and synthetic visualization system which comprises a fully mobile, self-contained data recording unit, a desktop graphics software engine for creating a playback of the recorded trip, a means of linking the mobile data recoding unit to the software engine for the purpose of exchanging information, and a centralized data storage and retrieval system designed to accept and assimilate recorded trip data and distribute pertinent data to system users.

It is another objective of the present invention to describe a method of flight instruction and analysis in which navigational data is captured by a mobile data recording unit and stored in the mobile data recording unit's memory to be transmitted an indefinite amount of time later for processing and display on an external computer system.

It is another objective of the present invention to describe a means of processing and displaying the information received from the mobile data recording unit by creating a three-dimensional playback of the recorded trip on a realistic, simulated representation of the actual environment in which the data was captured.

It is another objective of the present invention to describe a method of flight training in which navigational data is captured by a mobile data recording unit and transmitted for immediate display in real-time on a handheld computing device or mobile computer located in close proximity to the mobile data recording unit.

Finally, it is another objective of the present invention to describe a method of flight training in which navigational data is captured by a mobile data recording unit and transmitted for immediate display in real-time on a computer system at a remote location.

BRIEF DESCRIPTION OF THE DRAWINGS

The drawings constitute a part of this specification and include exemplary embodiments of the present invention illustrating various objects and features thereof

DESCRIPTION OF THE DRAWINGS

Figure 1:
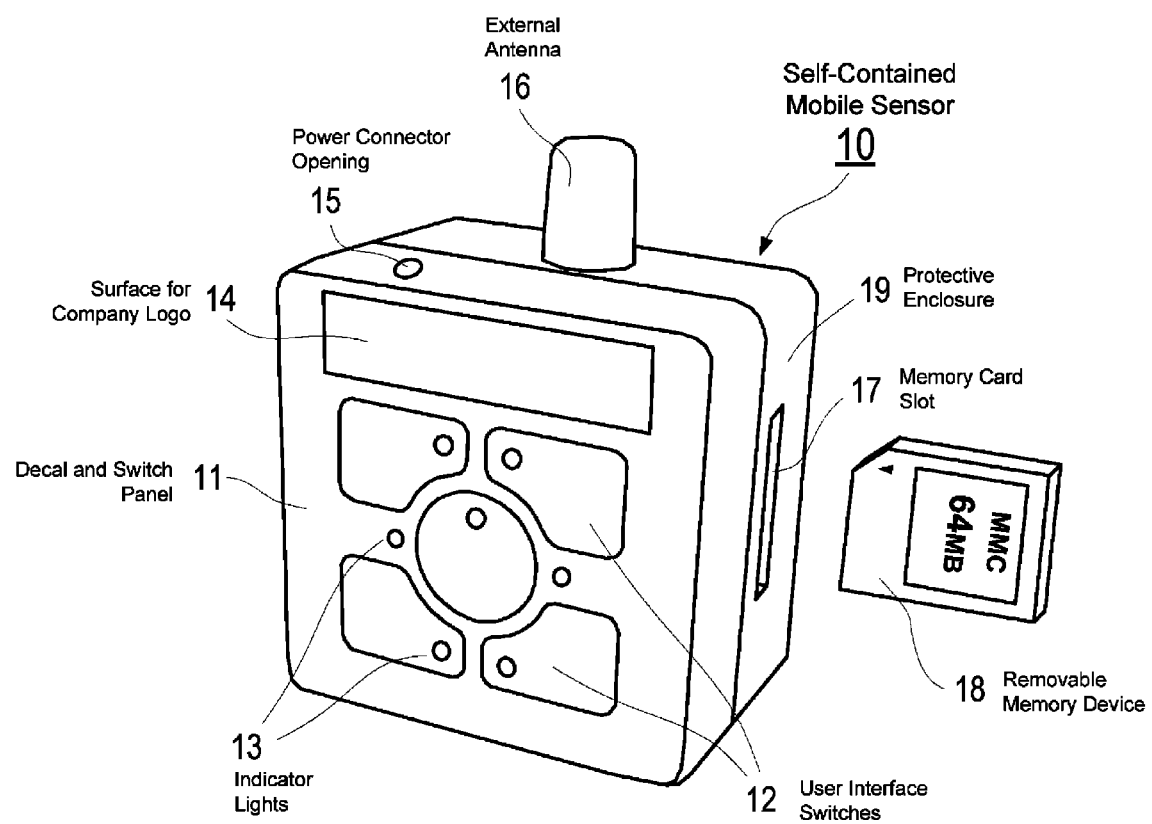
FIG. 1 shows a perspective view of a small, self-contained mobile sensor, which is one component of a flight training and synthetic visualization system described herein.

FIG. 1 shows a perspective view of a small, self-contained mobile sensor 10, which is one component of a flight training and synthetic visualization system described herein. The mobile sensor is contained in an enclosure 19, which provides environmental protection for the electronics which comprise the mobile sensor. A decal and switch panel 11 is adhered to the front surface of the enclosure 19, and provides a plurality of user interface switches 12, a plurality of indicator lights 13, and a surface 14 for a company logo or other printed matter. The mobile sensor contains a power connector opening 15 which accepts a jack from a recharging system. An external antenna 16 extends from the top of the mobile sensor for improved reception of satellite signals. An optional memory card slot 17 is provided for the use of removable memory devices such as a memory card 18.

Figure 2:
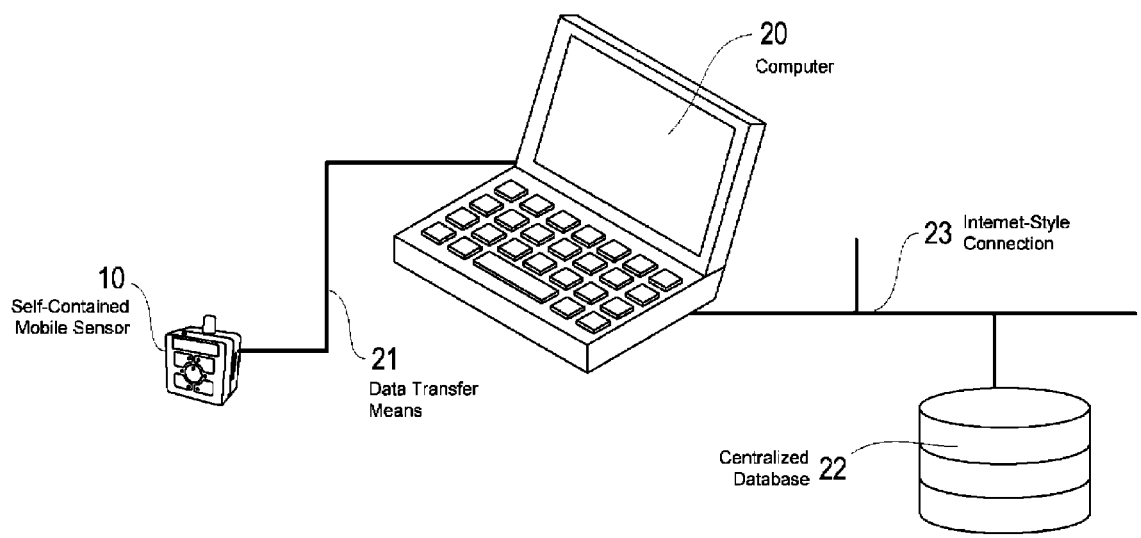
FIG. 2 shows an embodiment of the flight training and synthetic visualization system described herein.

FIG. 2 shows an example embodiment of the flight training and synthetic visualization system described herein. A mobile sensor 10 is mounted on an aircraft or other moving body and used to collect data about the movement of that body through space. This data may then be transferred by a transfer means 21 in real-time or asynchronously at a later time to a computer 20. The transfer means 21 may comprise a direct-wired connection, a wireless connection, or the transfer of data via a removable memory device. Software on the computer 20 is used to process and replay the data for the operator. The computer 20 can augment the playback of the data collected by the mobile sensor 10 by downloading satellite images and other information from a centralized database 22 over an internet-style connection 23. In this embodiment, the primary purpose of the flight training and synthetic visualization system is the playback and post-analysis of recorded flight data.

Figure 3:
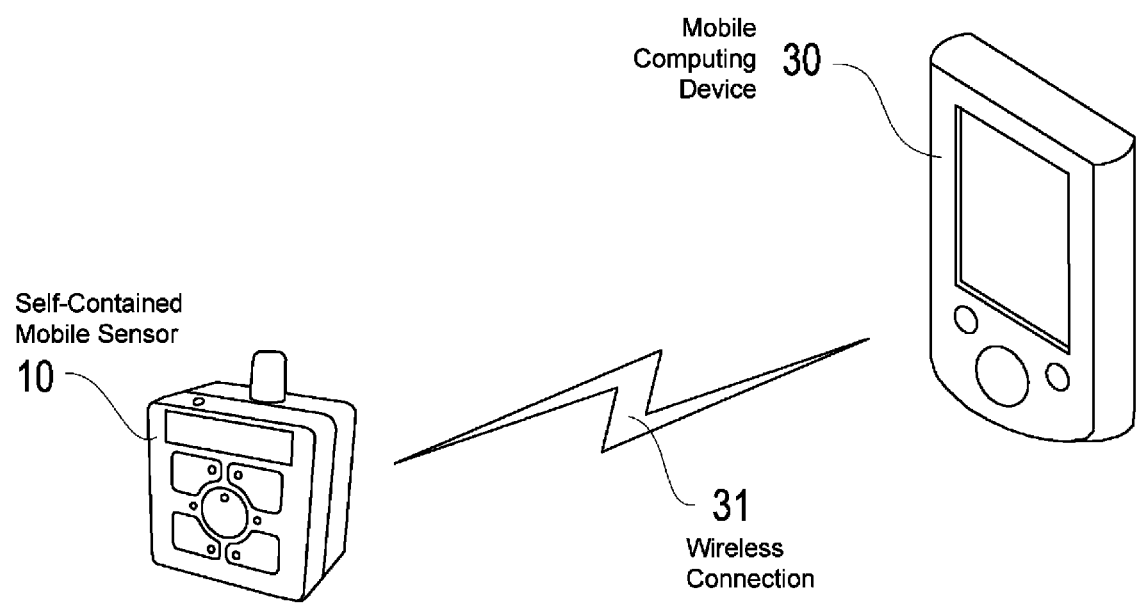
FIG. 3 shows an alternative embodiment of the flight training and synthetic visualization system described herein.

FIG. 3 shows an alternative embodiment of the flight training and synthetic visualization system described herein. A mobile sensor 10 is mounted on an aircraft or other moving body and used to collect data about the movement of that body through space. This data is then transferred in real-time over a wireless connection 31 to a handheld computer or other mobile computing device 30 for immediate viewing by the operator. In this embodiment, the primary purpose of the flight training and synthetic visualization system is to provide real-time, immediate feedback to the operator or instructor on an ongoing flight or trip.

Figure 4:
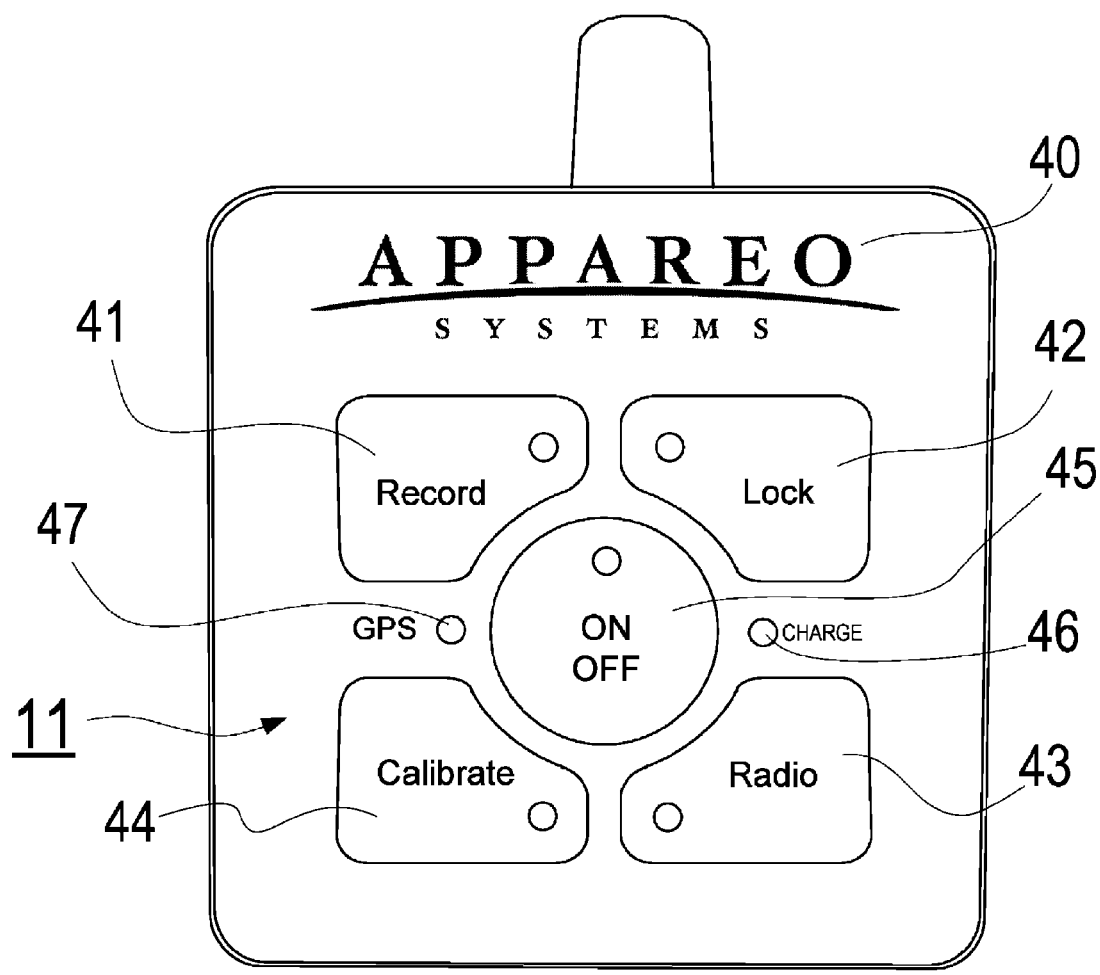
FIG. 4 shows an embodiment of the decal and switch panel for the mobile sensor.

FIG. 4 shows an example embodiment of the decal and switch panel 11 for the mobile sensor 10. It is not the intent of this figure to limit the decal and switch panel functions to those shown, but rather to show one possible embodiment of the user interface for illustration purposes. In this embodiment, the decal and switch panel 11 comprises a Record button and indicator light 41 for starting and stopping the data record function, a Lock button and indicator light 42 for locking the keypad against inadvertent key presses, a Radio button and indicator light 43 for initiating wireless data transfers, a Calibrate button and indicator light 44 for calibrating the mobile sensor 10, and an on/off button and indicator light 45 for turning the mobile sensor 10 on and off The decal and switch panel 11 further comprises a Charge indicator light 46 for indicating battery charge, a GPS indicator light 47 for indicating satellite connection, and a company logo 40.

Figure 5:
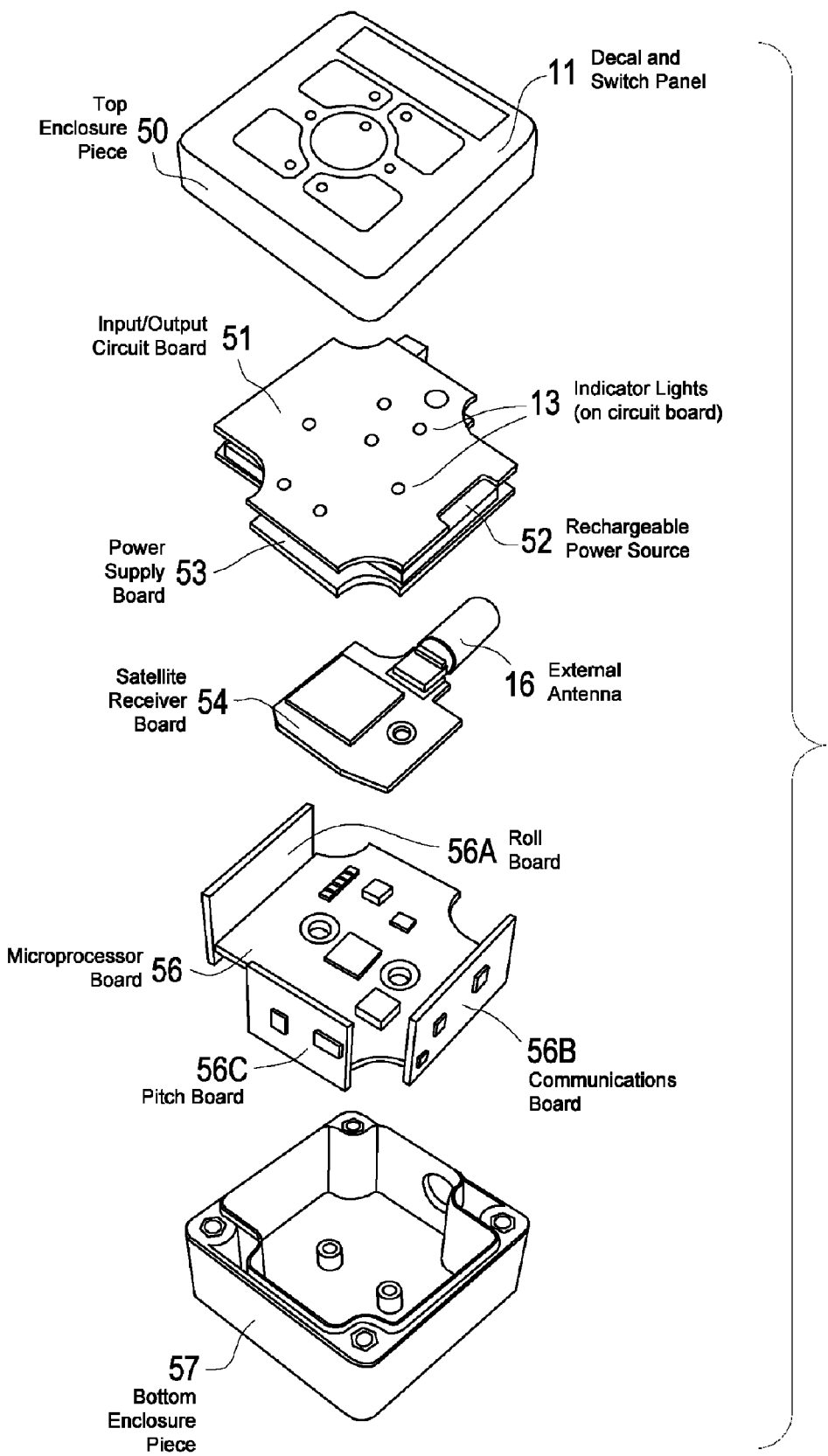
FIG. 5 shows an exploded perspective view of the mobile sensor, highlighting the main components.

FIG. 5 shows an exploded perspective view of the mobile sensor, highlighting the main components. A top enclosure piece 50 provides a surface for the decal and switch panel 11 and serves as the top half of a protective enclosure surrounding the electronics. An input/output (I/O) circuit board 51 comprises circuitry for detecting operator button presses from user interface switches 12 and houses the indicator lights 13. A power supply board 53 comprises circuitry for providing power to the electronics in the box and regulating any external power source that is supplied to the mobile sensor during charging. Sandwiched between the I/O board 51 and the power supply board 53 is a rechargeable power source 52 such as a battery. A satellite receiver board 54 comprises circuitry for receiving signals from satellite navigation systems such as the global positioning system (GPS). The satellite receiver board 54 also comprises an antenna means 16 to provide for the reception of satellite signals. A microprocessor board 56 comprises a microprocessor and related circuitry for overall control of the mobile sensor electronics. The microprocessor board 56 also comprises circuitry that allows the mobile sensor to sense rotation about its yaw axis. Attached to the microprocessor board 56 is the roll board 56A, which allows the mobile sensor to sense rotation about its roll axis, the pitch board 56C, which allows the mobile sensor to sense rotation about its pitch axis, and the communications board 56B, which comprises the circuitry necessary to allow the mobile sensor to communicate with a computer. The roll board 56A and the pitch board 56C are mounted perpendicular to each other and to the microprocessor board 56 in order to enable the mobile sensor to sense angular speed and rotation in each of three separate planes. A bottom enclosure piece 57 serves as the bottom half of the protective enclosure surrounding the electronics.

Figure 6:
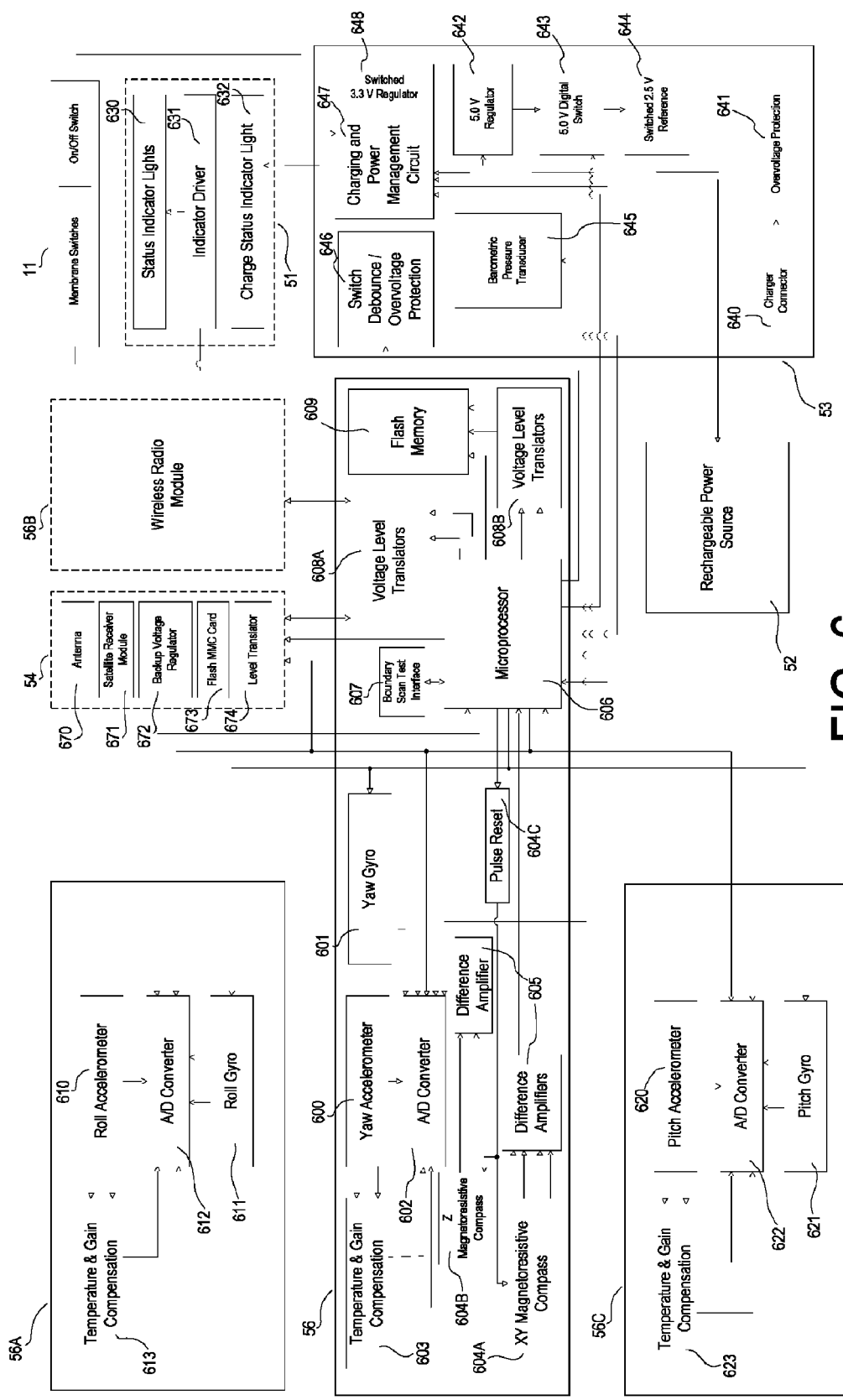
FIG. 6 shows a block diagram of the preferred embodiment of the electronic architecture for the mobile sensor.

FIG. 6 shows a block diagram of the preferred embodiment of the electronic architecture for the mobile sensor 10. At the highest level, the mobile sensor 10 comprises a microprocessor board 56, a roll board 56A, a pitch board 56C, a communications board 56B, a satellite receiver board 54, an input/output board 51, a rechargeable power source 52, a power supply board 53, and a decal and switch panel 11. These functional blocks are described in additional detail in the following paragraphs.

The microprocessor board 56 includes a yaw accelerometer 600 for sensing the magnitude of acceleration of the mobile sensor 10 about its yaw axis, and a yaw gyroscope 601 for sensing the rate of rotation of the mobile sensor 10 about its yaw axis.

The signal output by the yaw accelerometer 600 is sensitive to changes in ambient temperature. Temperature and gain compensation are provided by block 603 to correct this signal in various temperature conditions and to apply a gain multiplier to increase the amount of useful resolution available from the yaw signal. An analog-to-digital (A/D) converter 602 converts the analog yaw accelerometer 600 signal to a digital signal that can be used by the microprocessor 606. The A/D converter 602 also converts the analog yaw gyroscope 601 signal to a digital signal that can be used by the microprocessor 606.

The microprocessor board 56 further includes an XY magnetoresistive compass 604A for measuring the Earth's magnetic field in both the X and Y planes of movement, and a Z magnetoresistive compass 604B for measuring the magnetic field in the Z plane.

The magnetoresistive compasses 604A and 604B each contain an element which senses its orientation relative to the earth's magnetic field and which produces a differential voltage output based on its orientation in the magnetic field. These differential voltage outputs are sent to difference amplifiers 605, which amplify the outputs to useful voltage levels. The amplified output voltages are then sent to the A/D converter 602, which converts the analog signals from 604A and 604B to digital signals that can be used by the microprocessor 606. A pulse reset feature 604C sends a current pulse to the magnetoresistive compasses 604A and 604B periodically to remove any magnetic disturbances which may have built up on the sensing elements.

A boundary scan test interface circuit 607 such as JTAG is provided as a means of programming the microprocessor 606 and as a means of accessing and testing various unit features.

A storage device 609 such as a NAND flash memory module or a removable memory card is used to store the data collected by the microprocessor 606 until the data can be downloaded to a separate system. A voltage level translator 608B converts the voltage levels output by the storage device 609 into levels which can be used by the microprocessor 606, and vice versa. A second voltage level translator 608A is used to convert voltage levels between the microprocessor 606 and the satellite receiver board 54 and the wireless radio board 56B.

The roll board 56A includes a roll accelerometer 610 for sensing the magnitude of acceleration of the mobile sensor 10 about its roll axis, and a roll gyroscope 611 for sensing the rate of acceleration of the mobile sensor 10 about its roll axis.

Temperature and gain compensation is provided for the roll accelerometer 610 by block 613. An analog-to-digital (A/D) converter 612 converts the analog roll accelerometer 610 signal to a digital signal that can be used by the microprocessor 606. The A/D converter 612 also converts the analog roll gyroscope 611 signal to a digital signal.

The pitch board 56 includes a pitch accelerometer 620 for sensing the magnitude of acceleration of the mobile sensor 10 about its pitch axis, and a pitch gyroscope 621 for sensing the rate of acceleration of the mobile sensor 10 about its pitch axis.

Temperature and gain compensation is provided for the pitch accelerometer 620 by block 623. An analog-to-digital (A/D) converter 622 converts the analog pitch accelerometer 620 signal to a digital signal that can be used by the microprocessor 606. The A/D converter 622 also converts the analog pitch gyroscope 621 signal to a digital signal.

It should be noted that the terms roll, yaw, and pitch are used throughout this specification as a means of distinguishing each of the three axes about which the unit can move, and is not intended to imply that the roll accelerometer 610 is capable of only measuring rotation about an object's roll axis, and so on. Depending on how the mobile sensor 10 is mounted or held during a trip, the roll accelerometer 610 may actually be measuring the magnitude of acceleration on the object's pitch or yaw axes. This is also true for the yaw accelerometer 600, the pitch accelerometer 620, the roll gyroscope 611, the yaw gyroscope 601, and the pitch gyroscope 621.

The power board 53 includes a charger connector 640 for interfacing to an external power source such as a wall charger. This charger connector 640 is isolated from causing damage to the power board 53 by an overload protection circuit 641. The power board 53 includes a plurality of voltage regulators and references 642, 643, 644, and 648 for supplying power to the various circuit functions on the mobile sensor 10. A charging and power management circuit 647 is provided to oversee the charging of the rechargeable power source 52 and to selectively disable mobile sensor 10 functions in order to prolong battery life. A switch debounce and overvoltage protection circuit 646 is provided to prevent noisy user input lines from causing inadvertent feature activations. Finally, a barometric pressure transducer 645 is provided to detect changes in ambient barometric pressure, allowing the mobile sensor 10 to calculate changes in altitude.

A decal and switch panel 11 and indicator lights 51 are provided for interfacing with the operator. The indicator lights 51 include status indicator lights 630, an indicator driver circuit 631, and a separate charge status indicator light 632 that is tied directly to the charging and power management circuit 647 on the power board 53 to indicate the charge status of the rechargeable power source 52.

A wireless radio module 56B provides a mechanism for downloading the data stored in the storage device 609 to an external system via a wireless data connection. Alternate embodiments of the mobile sensor 10 may also use a direct-wired connection such as RS-232 or a removable memory device 673 to transfer data.

The satellite receiver board 54 includes an antenna 670 to increase reception, a satellite receiver module 671, a backup voltage regulator 672, a removable memory module 673 such as a Flash Multi-Media Card (MMC) or a Secure Digital (SD) card, and a voltage level translator 674 that allows the features on the satellite receiver board 54 to interface to the microprocessor 606.

Figure 7:
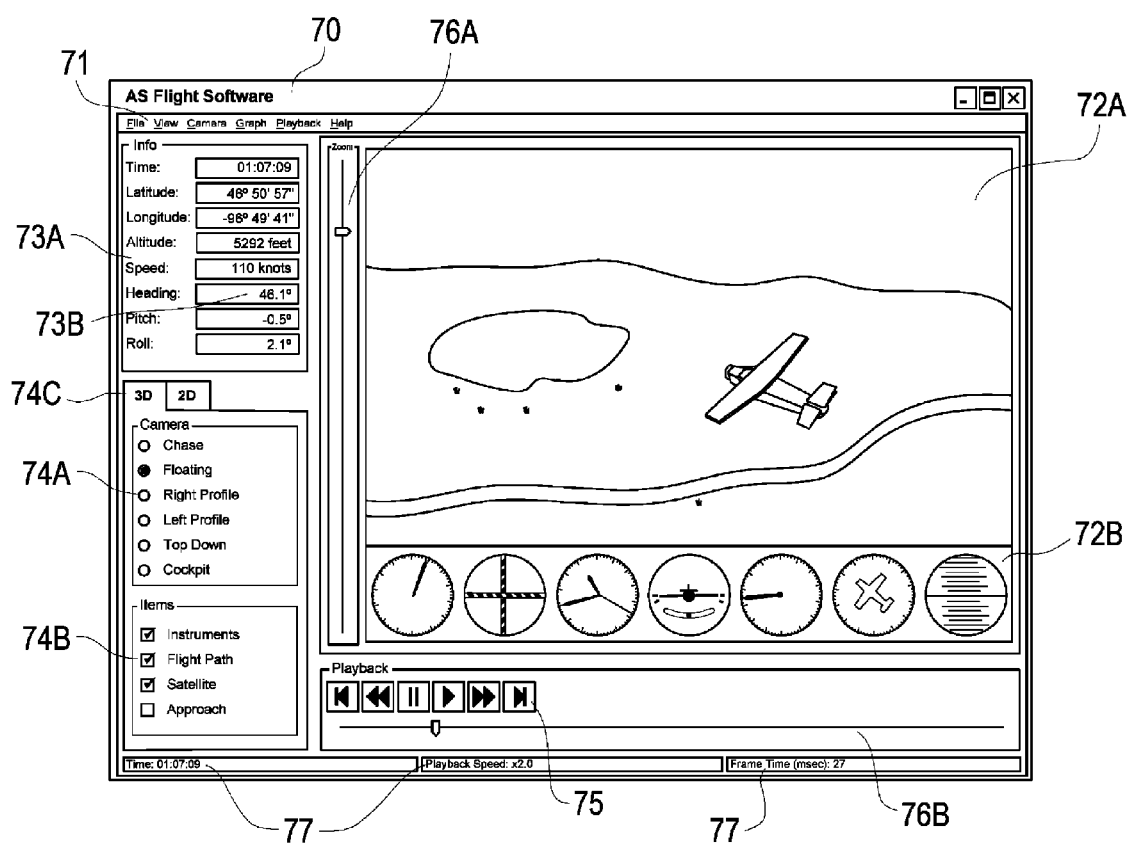
FIG. 7 shows an example of a representative graphical user interface (GUI) for a flight analysis application that executes on a separate desktop or handheld computer.

FIG. 7 shows an example of a representative graphical user interface (GUI) for a flight analysis application that executes on a separate desktop or handheld computer. This flight analysis application processes the data captured by the mobile sensor 10, performs any correctional adjustments required to the data, creates a three-dimensional representation of the motion of the sensor corresponding to the data, and displays the recreated event on the computer monitor. The features described herein are examples only and are not meant to limit the functionality in any manner. The main window 70 is a typical graphical user interface (GUI) window. A set of pull-down menus 71 provides a list of typical commands and command types. A synthetic vision window 72A is dedicated to displaying the recreated playback on a synthetic three-dimensional environment, which may include actual satellite or high-altitude photos of the environment where the data was recorded. A simulated gauge panel 72B provides a functioning set of simulated aircraft gauges and instruments. A portion of the screen is dedicated to the display of specific data parameters, including the parameter labels 73A and text boxes 73B containing the numeric values associated with these parameters. Another portion of the screen is dedicated to providing alternate views of the playback to the operator, including button controls featuring default "camera angles" 74A, button controls used to toggle display items 74B on and off, and a tab control device 74C for selecting between three-dimensional (3D) viewing of the data and two-dimensional (2D) viewing of the data. VCR-style controls 75 (such as forward, reverse, play, and pause) are provided to allow the operator to move backward and forward through the playback at will, and a progress indicator bar 76B is provided to indicate the current position in the playback, as well as to act as a slider control for moving to any point in the playback. A vertical zoom slider bar 76A is provided to move the "camera" in to and out from the aircraft during the playback. Additional data displays 77 provide information to the user, such as current playback speed, a time readout for the current playback, and the number of graphics frames per second being displayed.

Figure 8:
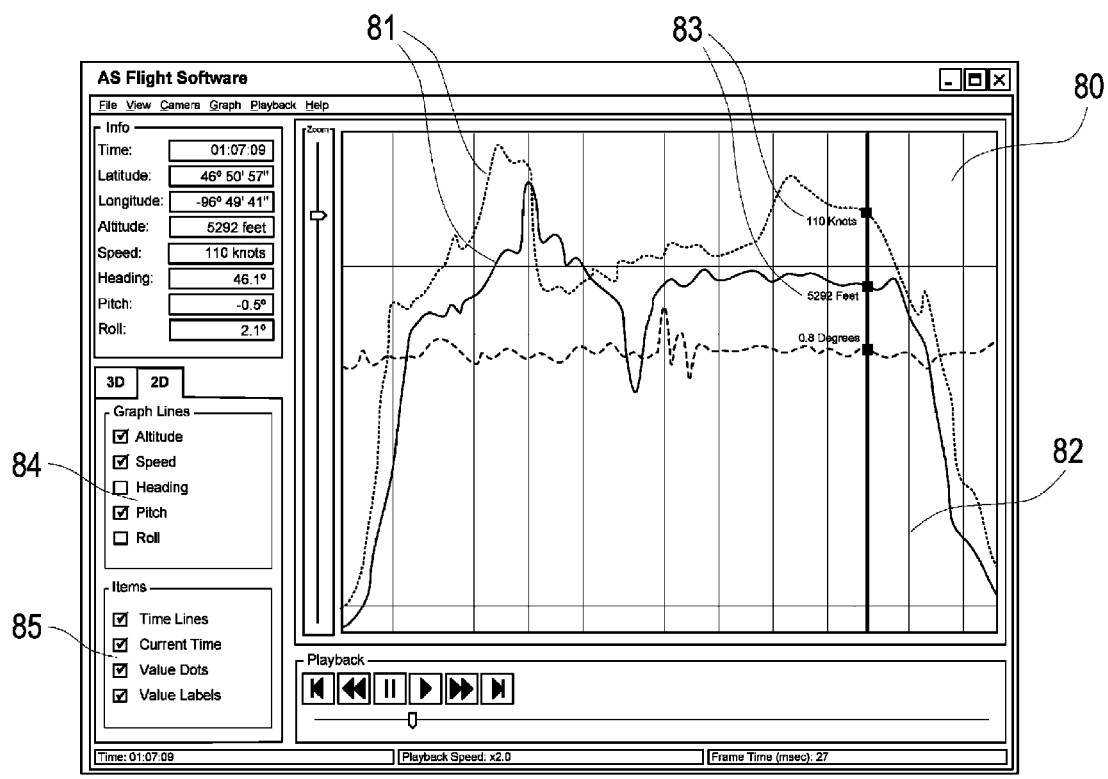
FIG. 8 shows the same example graphical user interface (GUI) as shown in FIG. 7 with changes to represent how the flight analysis application might appear when the data is displayed in two-dimensional mode, or graph mode.

FIG. 8 shows the same example graphical user interface (GUI) as shown in FIG. 7 with changes to represent how the flight analysis application might appear when the data is displayed in two-dimensional mode, or graph mode. Only the features that have changed from FIG. 7 have been numbered in FIG. 8, and all other features should be considered identical to FIG. 7. Again, the features described herein are examples only and are not meant to limit the functionality in any manner.

Figure 9:
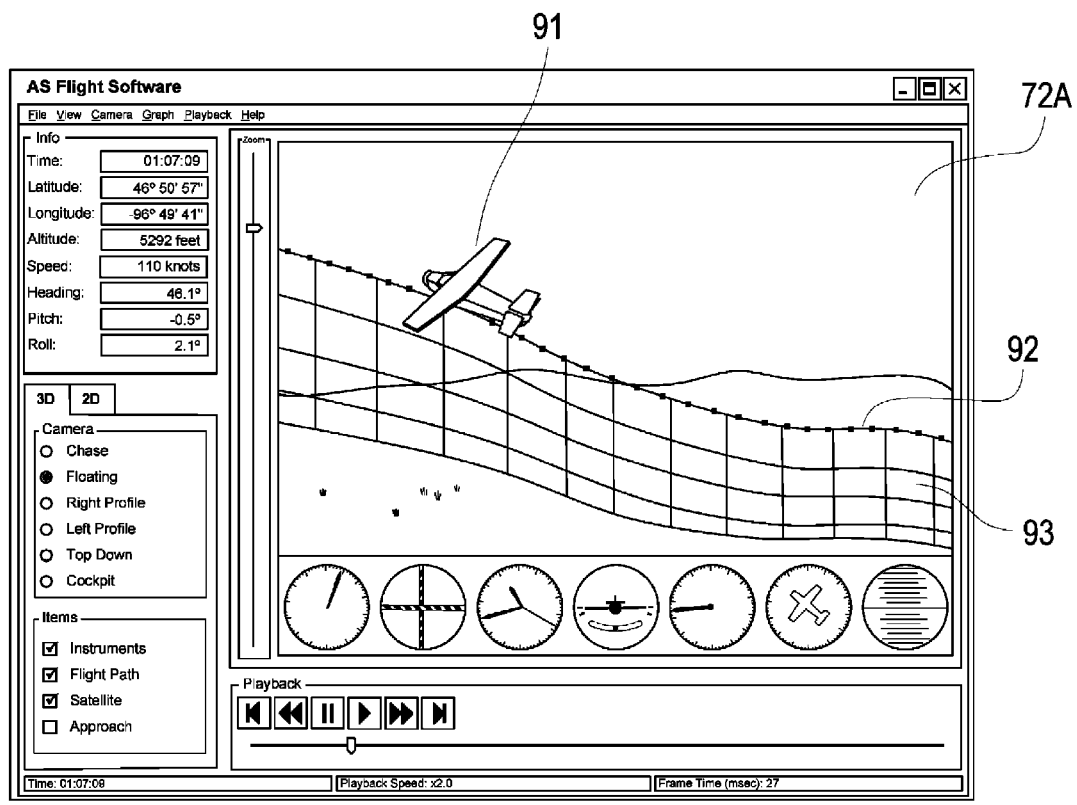
FIG. 9 shows the same example graphical user interface (GUI) as shown in FIGS. 7 and 8 with changes to represent additional graphical features available during the three-dimensional (3D) playback.

A graph window 80 is displayed with a grid pattern 82 representing units of playback time and data value magnitude. Graphical plots 81 of several different flight parameters are plotted against the grid pattern 82, corresponding to actual data values seen during the recorded event. Parameter labels 83 are provided to show the actual numeric value at the current point in the playback. Graph line controls 84 appear in two-dimensional mode to allow the user to select which plot lines appear on the graph window 80. Graph item controls 85 appear to allow the user to toggle the display of certain graph items on or off FIG. 9 shows the same example graphical user interface (GUI) as shown in FIG. 7 and FIG. 8 with changes to represent additional graphical features available during the three-dimensional (3D) playback. The synthetic vision window 72A again shows a playback of a recorded flight on a three-dimensional recreation of the environment in which the data was recorded. A model of the aircraft 91 is displayed at a position and orientation corresponding to the position and orientation of the actual aircraft. A data ribbon 92 extends behind and in front of the aircraft showing the recorded flight path. A checkerboard altitude wall 93 provides a graphical representation of the altitude of the aircraft, where each square of the checkerboard pattern represents a pre-defined number of feet of both horizontal and vertical distance.

Figure 10:
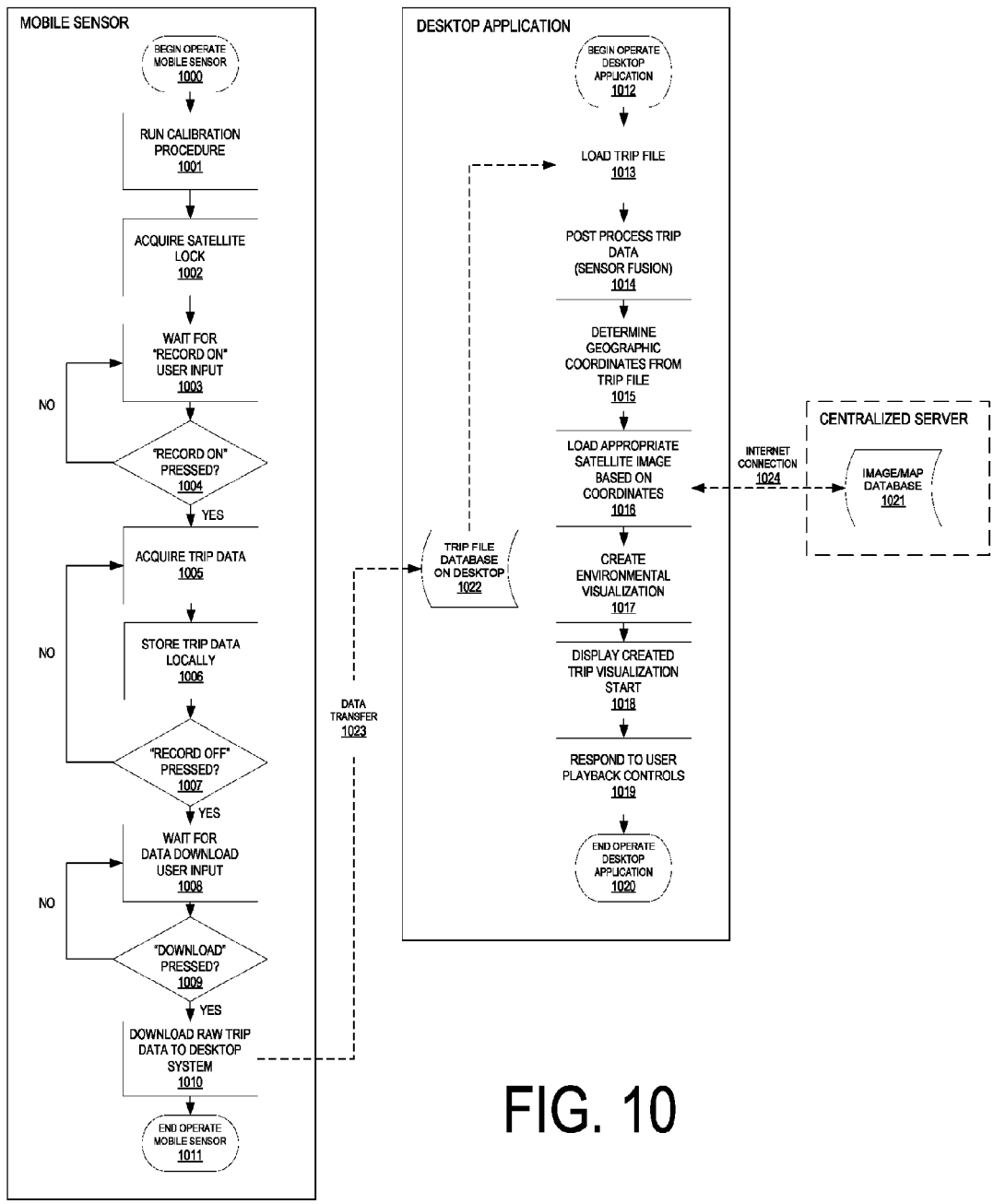
FIG. 10 is a high-level flowchart showing the flow of control required on the mobile sensor, the desktop application running on the desktop computer or the handheld computing device, and the centralized server during a typical record and playback cycle.

FIG. 10 is a high-level flowchart showing the flow of control required on the mobile sensor 10, the desktop application running on the desktop computer 20 or the handheld computing device 30, and the centralized server 22 during a typical record and playback cycle. Processing starts in "Begin Operate Mobile Sensor" 1000, which represents the operator turning the mobile sensor 10 on. A calibration procedure 1001 is typically required to initialize the mobile sensor 10 to a known state. The mobile sensor 10 must then acquire a signal lock on the GPS satellite 1002 in order to begin recording satellite data. Once satellite lock 1002 is obtained, the mobile sensor 10 must wait for the user to press the record button 1003 and 1004, after which it begins to acquire data 1005 via the on-board sensors. This data is stored locally in the on-board memory 1006 until the operator presses the Record button a second time to turn off the record function 1007. After the record function is terminated 1007, the mobile sensor 10 waits until a data download is commanded 1008 and 1009, and then downloads the data to the desktop system 1010 via a data transfer means 1023, which may include a direct-wired connection, a wireless connection, or data transfer by means of a removable memory device, thereby ending the "acquire data" operation of the mobile sensor 1011. The downloaded data is stored on the desktop application in a trip file database 1022.

Processing for the desktop application begins in "Begin Operate Desktop Application" 1012, representing the operator executing the desktop application. The desktop application loads the trip file 1013 from the trip file database 1022 and begins post-processing the data 1014, depending on stored readings from multiple sensor functions integral to the mobile sensor to create a highly accurate trip data file. Based on the geographic coordinates stored in the data file 1015, the desktop application then downloads one or more satellite or high-altitude images corresponding to the data file 1016 from an external image/map database on a centralized server 1021 or over an internet connection 1024. The desktop application then creates a synthetic representation of the environment 1017, displays the created trip visualization on the monitor 1018, and then responds to operator inputs via the playback controls and application commands 1019. The process terminates with "End Operate Desktop Application" 1020, which represents the operator terminating the desktop session and exiting the software.

Figure 11:
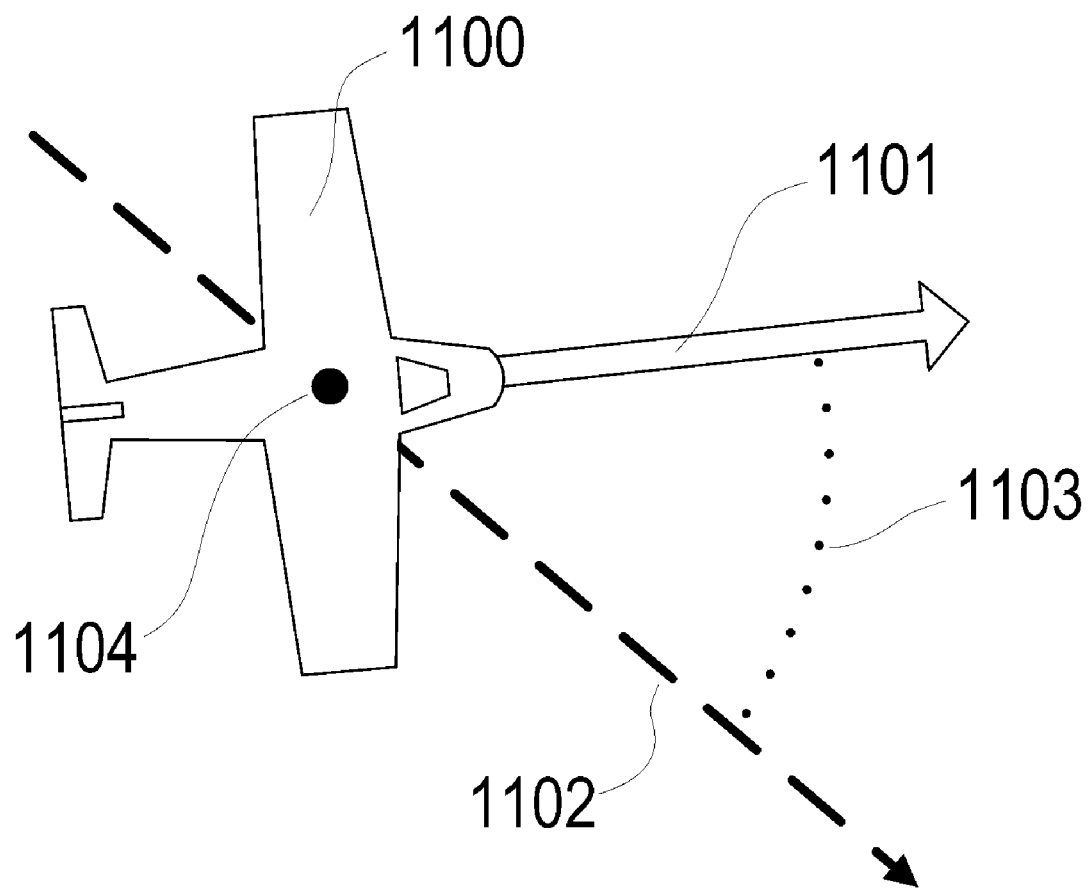
FIG. 11 provides a definition of the term yaw, and shows a top view of a moving body such as an aircraft.
Figure 12:
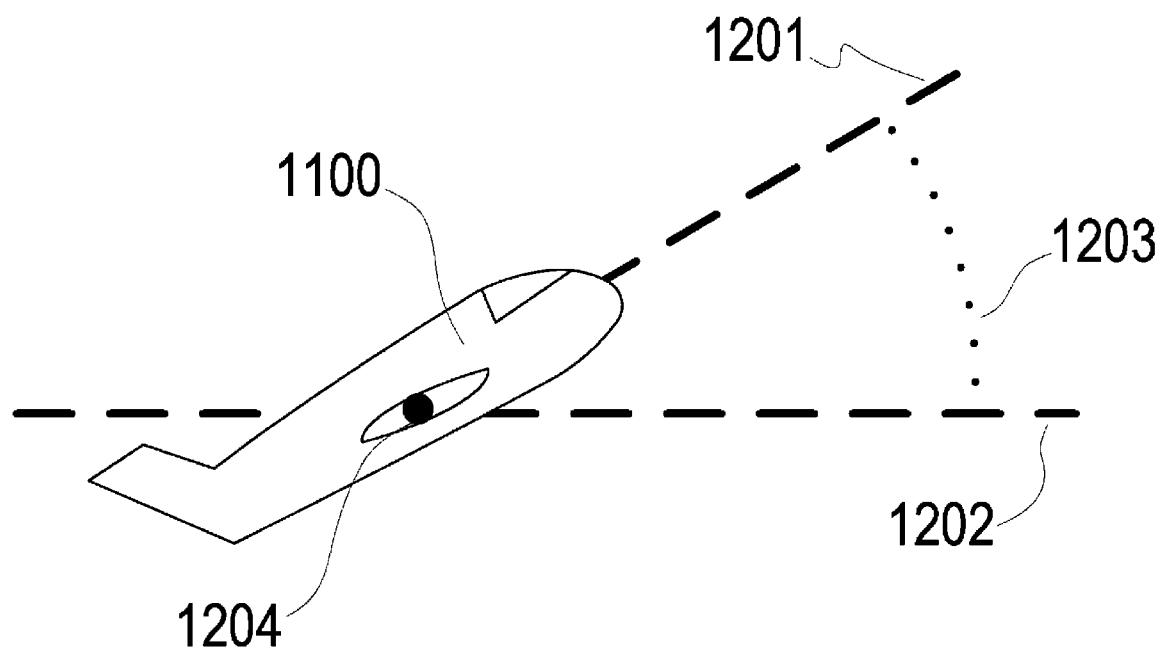
FIG. 12 provides a definition of the term pitch, and shows a side view of a moving body such as an aircraft.
Figure 13:
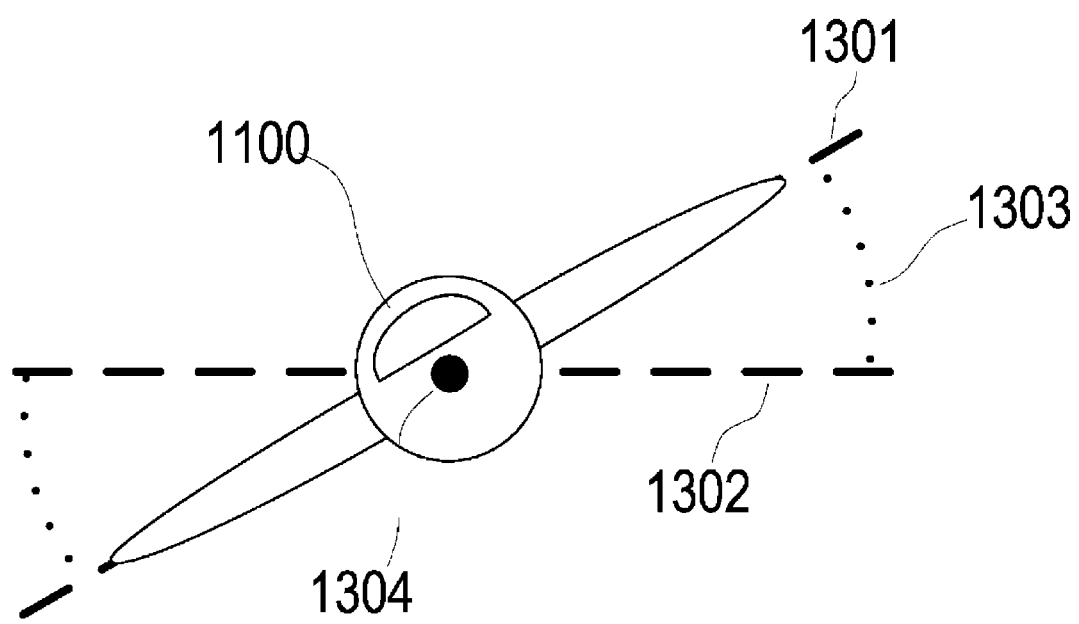
FIG. 13 provides a definition of the term roll, and shows a front view.

FIGS. 11, 12, and 13 provide definitions of the terms yaw, pitch, and roll, respectively, and are not otherwise referenced in the text of this specification. These terms are used throughout the specification and it is important that they are fully understood in this context.

FIG. 11 provides a definition of the term yaw, and shows a top view of a moving body 1100 such as an aircraft. The yaw angle 1103 is the number of degrees measured between the course 1102 of the moving body 1100 and the heading 1101 of the moving body 1100. The course 1102 of an object is defined to be the actual direction of movement of that object, and the heading 1101 is defined to be the direction that the object is facing. The yaw axis 1104 is the point about which the moving body 1100 rotates when demonstrating a change in yaw.

FIG. 12 provides a definition of the term pitch, and shows a side view of a moving body 1100 such as an aircraft. The pitch angle 1203 is the number of degrees measured between the "level" orientation of flight 1202 for the moving body 1100 and current orientation 1201 of the moving body 1100, as the moving body 1100 rotates about the pitch axis 1204.

FIG. 13 provides a definition of the term roll, and shows a front view of a moving body 1100 such as an aircraft. The roll angle 1303 is the number of degrees measured between the "level" orientation of flight 1302 for the moving body 1100 and current orientation 1301 of the moving body 1100, as the moving body 1100 rotates about the roll axis 1304.

DETAILED DESCRIPTION OF THE PREFERRED EMBODIMENT

In the preferred embodiment, the flight training and synthetic visualization system is used primarily as a flight training aid, providing playback and analysis of flight data recorded by a mobile sensor (this embodiment is illustrated in FIG. 2). A user mounts the mobile sensor 10 in or on an aircraft or other moving object (the moving object could also be a person such as a skydiver). The mobile sensor 10 is turned on, the Record button is pressed, and recording begins. Once operational, the mobile sensor 10 follows the algorithm described in FIG. 10 (Steps 1000 through 1011), acquiring flight data describing the position and orientation of the mobile sensor 10 as it moves through three-dimensional space.

While it is recording, the mobile sensor 10 relies on a plurality of on-board sensors to obtain flight data. In the preferred embodiment (FIG. 6), the mobile sensor 10 comprises:

- a yaw accelerometer 600, a roll accelerometer 610, and a pitch accelerometer 620 to record the magnitude of acceleration of movement in three dimensions,
- a yaw gyroscope 601, a roll gyroscope 611, and a yaw gyroscope 621 to record the rate of acceleration of movement in three dimensions,
- two magnetoresistive compasses 604A and 604B to record the magnetic heading by measuring the Earth's magnetic field,
- a barometric pressure transducer 645 to measure the ambient barometric pressure,
- a wireless radio module 56B to allow the mobile sensor 10 to communicate bi-directionally and wirelessly with the computer 20 hosting the desktop application,
- a satellite receiver board 54 to allow the mobile sensor 10 to receive transmissions from the global positioning system,
- removable memory 673 as an alternate means of transferring data between the mobile sensor 10 and the computer 20 hosting the desktop application,
- permanent on-board memory 609 for storing the flight data as it is recorded,
- a rechargeable power source 52 to provide wireless power to the mobile sensor 10, and
- user feedback devices in the form of a plurality of buttons 11 and a plurality of indicator lights 51.

Using this preferred electronic architecture, the mobile sensor 10 records all movement and changes in orientation and stores this data in the on-board memory 609 for later transmission to the computer 20. In this embodiment, the mobile sensor 10 does very little processing of the data. This data is simply stored and later transferred to the computer 20 where the desktop application will perform post-processing of the data before playback.

Alternate embodiments of the mobile sensor 10 can be created with a smaller number of on-board sensors. While this would lower the accuracy of the data obtained, this approach would produce data that would be sufficient for many applications that do not require sophisticated or highly accurate monitoring of movement (such as the tracking of land-based vehicles) and would result in a lower cost sensor.

Additional alternate embodiments of the mobile sensor 10 could be created by adding additional sensors or additional data inputs via the optional radio to the preferred embodiment. In this manner information such as engine performance characteristics, waypoints, etc., could be added to the stored data set for later retrieval. These additional inputs could be added based on the specific needs of any application.

Once the mobile sensor 10 has finished recording a flight or trip, the operator can terminate the recording process. The mobile sensor 10 can then be turned off or set up to record another flight. Data already recorded will be maintained indefinitely in the on-board memory 609 or in the optional removable memory 673, until such time as the data can be downloaded to the computer 20 hosting the desktop application.

When all flights or trips have been recorded, the user can transfer the data from the mobile sensor 10 to the computer 20 using either the wireless or hardwired communication link 21, or, if so equipped, by taking the removable memory device 673 out of the mobile sensor 10 and bringing it by hand to the computer 20. In any event, the data is transferred to the computer 20 and stored in a trip database 1022.

Additional alternate embodiments of the mobile sensor 10 could also be created by using combinations of different memory devices and data transfer means. Versions of the mobile sensor 10 could contain permanent on-board flash memory 609, a removable memory device such as an MMC card 673, or both. The mobile sensor 10 could also have no on-board memory means and simply transfer the data immediately to an external device, such as the desktop computer 20.

Upon request by the user, the desktop application running on the computer 20 will load the trip data file 1013 and begin post-processing the data 1014. This post-processing consists of analyzing the values gathered by multiple, redundant sensors (as described in FIG. 6) and comparing and combining the values to achieve a data accuracy that would not be attainable by any single sensor alone. For example, if there is a gap in the GPS data received by the mobile sensor 10 (perhaps when the satellite data is unavailable for a period of time), the movements recorded by the accelerometers (600, 610, and 620) and gyroscopes (601, 611, and 621) can be used to fill in the gaps. In addition, changes in barometric pressure detected by the barometric pressure transducer 645 can be used by the mobile sensor 10 to calculate changes in altitude, which can supplement or replace the altitude derived from GPS data and inertial measurement sensors.

By transferring this processing activity from the mobile sensor 10 to the desktop computer 20, the system can take advantage of the processing power inherent in a typical desktop computer and off-load the processing burden from the mobile sensor 10 thus reducing the cost and complexity of the mobile sensor 10.

Once the post-processing 1014 has been completed, the desktop application uses the geographic coordinates stored in the data file 1022 to calculate the area of the Earth's surface for which a satellite or aerial image is required. It then interfaces to an image/map database 1021 on a centralized server over an internet-style connection 1024 and downloads a satellite or aerial photo (or series of photo tiles) that corresponds to the geographic location 1016 and creates a realistic, three-dimensional graphic visualization 1017 of the aircraft (or moving object) and its immediate environment. The desktop application then responds to user inputs 1019 allowing the user to play back the trip visualization as one would play a movie on a DVD player.

A typical embodiment of the user interface for the desktop application is shown in FIGS. 7, 8, and 9. A typical embodiment of the desktop application would provide an area on the screen for the three-dimensional playback 72A as well as simulated flight instruments 72B, an area of text boxes 73A and 73B showing dynamic readouts of important flight parameters, operator controls 74A, 74B, and 74C to allow the operator to control the angle at which the playback is shown, and DVD-style playback controls 75. In addition, data sets recorded by multiple mobile sensors, such as those used by a team of skydivers, could be superimposed on the same three-dimensional playback 72A to allow for performance comparisons. Airport-specific data, such as approach plates and glideslope and localizer paths, can be superimposed on the flight playback to allow a pilot to see how they performed during a landing. Graphical devices can be used to show the status of certain flight parameters. For instance, a three-dimensional graph of an airplane's altitude can be shown in the form of a checkerboard wall 93 that is displayed between the ground and the model of the aircraft 91 in the playback, where each square on the checkerboard represents a certain number of feet in altitude or horizontal distance. A secondary ghost image of the aircraft model 91 could be displayed on the three-dimensional playback 72A to show variance from an ideal flight path such as the approach path of an airport. Visualizations of special airspace types, such as restricted flight zones or aerobatic performance boxes, could be superimposed on the three-dimensional playback 72A. Simulated weather patterns can be created to match actual weather conditions that existed at the time of the flight.

The desktop application can also be used to display data on the flight in two-dimensional graph mode 80. In two-dimensional graph mode 80, plot lines of the flight parameters 81 and current value labels 83 are displayed on a graph-like grid pattern 82 to allow for the analysis of the flight.

In an alternate embodiment of the flight training and synthetic visualization system (FIG. 3), the mobile sensor 10 is used to gather flight data that is displayed in real-time (while the trip is ongoing) on a portable laptop or handheld computing device 30. In this embodiment, the system would be used primarily as a visual flight aid to provide additional flight data and analysis to a pilot while the flight is in progress.

The handheld device 30 would be co-located with the mobile sensor 10 and would transfer data in real-time over a wireless data connection 31. The application running on the handheld device 30 would be similar to the application running on the desktop computer 20, but in most cases would not have a connection to a centralized database. A realistic graphical depiction of the flight in progress would be displayed on the handheld device 30, allowing the pilot to view their ongoing flight from any angle and to display analytical information during the flight. Satellite images could be pre-loaded to the handheld device 30 by the user before the flight, or a grid or similar artificial background could be used for the real-time playback.

Having thus described the invention, what is claimed as new and desired to be secured by the Letters Patent is:

1. A method of detecting, recording, coprocessing and simultaneously displaying aircraft flight data and corresponding terrain data, which method comprises the steps of:
   providing a self-contained mobile data recording unit (MDRU) on the aircraft;
   providing said MDRU with an MDRU microprocessor;
   gathering with said MDRU microprocessor flight data including navigation and flight information captured by said MDRU;
   providing said MDRU with a computer readable media and storing said navigation and flight information on said MDRU computer readable media;
   computing a 3-D recreation of a flight path of the aircraft based on said navigational and flight information;
   computing a digital terrain model for an area of the Earth's surface including at least a portion of the flight path;
   generating a 3-D display of said 3-D recreation including: said terrain model; a representation of the aircraft superimposed on the terrain model; and a data ribbon representing the flight path superimposed on the terrain model;
   computing altitude readings from said navigational and flight information at pre-defined intervals along the flight path;
   using said altitude readings and said navigational and flight information to compute a 3-D display comprising a vertical synthetic flight wall extending downwardly from said flight path data ribbon to a ground level on said terrain model;
   subdividing said flight wall graphically into a vertically-oriented checkerboard configuration comprising multiple rectangular segments separated by multiple, horizontally-spaced vertical striations each representing a pre-defined horizontal distance and multiple, vertically-stacked horizontal striations each representing a pre-defined vertical distance, said pre-defined vertical and horizontal distances corresponding to altitude and distance of travel along said flight path respectively;
   dynamically displaying in 3-D on said display device said flight wall including said vertical and horizontal striations below said flight path data ribbon;
   dynamically displaying in 3-D on said display device with said graphics software engine the progress along said flight path of the aircraft on top of said flight wall and over said terrain model; and
   dynamically displaying aircraft altitudes at respective rectangular segments along said flight path.

2. The method of claim 1, which includes the additional steps of:
   providing an inertial measurement sensor (IMS) on the aircraft;
   sensing orientation of the aircraft and generating orientation signals representing its orientation with said IMS;
   inputting said orientation signals to said computer; and
   computing said flight path using said orientation signals.

3. The method of claim 2 wherein said IMS includes yaw, pitch and roll sensors, which method includes the additional steps of:
   continuously sensing 3-D orientation of the aircraft with said IMS;
   generating orientation signals with said IMS corresponding to the yaw, pitch and roll of the aircraft; and
   outputting said orientation signals from said IMS as input to said microprocessor.

4. The method of claim 1, which method includes the additional steps of:
   generating 3-D, GNSS-based aircraft position signals;
   inputting said aircraft position signals to said microprocessor; and
   computing a data ribbon representing said flight path using said aircraft position signals.

5. The method of claim 1 wherein said 3-D display comprises a moving video representation of said aircraft progressively moving along said flight path data ribbon.

6. The method of claim 1, which includes the additional steps of:
   interfacing said microprocessor with an image/map database including 3-D terrain images comprising satellite or aerial photos or photo tiles;
   computing with said microprocessor an area of the Earth's surface including at least a portion of the flight path; and
   downloading satellite or aerial photos or photo tiles for said calculated area of the Earth's surface from said image/map database to said microprocessor.

7. The method of claim 1, which includes the additional steps of:
   providing said computer with a graphics software engine;
   gathering weather pattern information;

creating with said graphics software engine a display comprising a graphical representation of said weather pattern information; and displaying with said display device said graphical representation of said weather pattern information superimposed on said 3-D recreation.

8. The method of claim 1, which includes the additional steps of:

gathering special airspace type information;

creating with said graphics software engine a display comprising a graphical representation of said special airspace type; and displaying with said display device said graphical representation of said special airspace type superimposed on said 3-D recreation.

9. The method of claim 1, which includes the additional steps of:

collecting navigational and flight information in-flight with said computer;

providing a secondary computer;

connecting said secondary computer to said aircraft computer; and post-processing said navigational and flight information and displaying said 3-D recreation with said secondary computer after a flight is completed.

10. The method of claim 9 wherein said secondary computer comprises a handheld device and said method includes the additional step of:

processing in real time during said flight said navigational and flight information and displaying said 3-D recreation on said handheld device.

11. The method of claim 1 wherein said aircraft representation comprises a primary aircraft model, which method includes the additional steps of:

generating a secondary ghost image model of the aircraft;

computing an ideal flight path corresponding to locations of said secondary ghost image aircraft model;

superimposing on said 3-D display said secondary ghost image model in relation to said primary aircraft image model; and displaying with said display device discrepancies between said ideal flight path and the actual flight path by simultaneously and dynamically displaying the positions of said primary and secondary aircraft image models relative to each other and the flight wall.

12. A method of sensing and computing aircraft flight data associated with an aircraft flight path, and simultaneously displaying an aircraft flight path, flight wall and terrain model for a flight, which method comprises the steps of:

generating signals representative of a 3-D, GNSS-based flight path of said aircraft with said position detector;

providing a computer including a microprocessor on the aircraft and connected to the IMS and the position detector;

providing a digital terrain model of a portion of the Earth's surface including at least a portion of the flight path;

computing a 3-D display of said flight path including: said terrain model; a primary aircraft image model superimposed on and simulating movement relative to the terrain model; and a data ribbon representing the flight path superimposed on the terrain model;

computing with said altitude readings and said navigational and flight information a 3-D vertical flight wall extending downwardly from said flight path data ribbon to a ground level on said terrain model;

said flight wall being subdivided graphically into a checkerboard configuration comprising multiple rectangular segments each representing a pre-defined horizontal and vertical distance corresponding to altitude and distance of travel along said flight path respectively;

providing a display device and connecting said display device to said microprocessor;

displaying with said display device said 3-D display with said primary aircraft image model on top of said flight wall and said aircraft altitudes over said terrain model;

generating a secondary ghost image model of the aircraft;

computing an ideal flight path corresponding to locations of said secondary ghost image aircraft model;

superimposing on said 3-D display said secondary ghost image model in relation to said primary aircraft image model;

displaying with said display device discrepancies between said ideal flight path and the actual flight path by simultaneously and dynamically displaying the positions of said primary and secondary aircraft image models relative to each other and the flight wall;

collecting navigational and flight information in-flight with said computer;

providing a secondary computer;

connecting said secondary computer to said aircraft computer; and post-processing said navigational and flight information and displaying said 3-D recreation with said secondary computer after a flight is completed.

13. A system for simulating an aircraft flight, which system comprises:

an inertial measurement sensor (IMS) installed on the aircraft and adapted for sensing orientation of the aircraft and generating orientation signals;

a global navigation satellite system (GNSS) position detector installed on the aircraft and adapted for generating signals representative of a 3-D, GNSS-based flight path of said aircraft;

a computer including a microprocessor installed on the aircraft and connected to the IMS and the position detector;

said microprocessor being connected to and receiving input signals comprising navigational and flight information from said IMS and said GNSS position detector;

said computer being adapted for receiving a digital terrain model of a portion of the Earth's surface including at least a portion of the flight path;

said computer being adapted for computing a 3-D display of said flight path including: said terrain model; a model of the aircraft superimposed on and simulating movement relative to the terrain model; and a data ribbon representing the flight path superimposed on the terrain model;

said computer being adapted for computing altitude readings from said navigational and flight information at predetermined intervals along the flight path;

said computer being adapted for computing with said altitude readings and said navigational and flight information a 3-D vertical flight wall extending downwardly from said flight path data ribbon to a ground level on said terrain model;

said flight wall being subdivided graphically into a checkerboard configuration comprising multiple rectangular segments each representing a pre-defined horizontal and vertical distance corresponding to altitude and distance of travel along said flight path respectively; and a display device connected to said microprocessor and adapted for displaying said 3-D display with said aircraft model on top of said flight wall and said aircraft altitudes over said terrain model.

14. The aircraft flight simulation system according to claim 13, which includes:
a graphics software engine installed on said computer and adapted for generating said 3-D display including a moving video representation of the aircraft progressively moving along the flight path data ribbon.

15. The aircraft flight simulation system according to claim 13, which includes:
said computer comprising a primary computer; and
a secondary computer adapted for connection to said primary computer and post-processing sent navigational and flight information and displaying said 3-D recreation after a flight is completed.

16. The aircraft flight simulation system according to claim 13 wherein said secondary computer comprises a handheld device adapted for processing in real-time during said flight said navigational and flight information and displaying said 3-D recreation on said handheld device.

* * * * *